United States Patent
Holland et al.

(10) Patent No.: US 9,607,574 B2
(45) Date of Patent: Mar. 28, 2017

(54) VIDEO DATA COMPRESSION FORMAT

(71) Applicant: Apple Inc., Cupertino, CA (US)

(72) Inventors: Peter F. Holland, Los Gatos, CA (US); Brijesh Tripathi, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 844 days.

(21) Appl. No.: 13/963,511

(22) Filed: Aug. 9, 2013

(65) Prior Publication Data

US 2015/0042659 A1    Feb. 12, 2015

(51) Int. Cl.
| | |
|---|---|
| H04N 5/445 | (2011.01) |
| G09G 5/00 | (2006.01) |
| G06T 3/40 | (2006.01) |
| G06T 9/00 | (2006.01) |
| H04N 19/134 | (2014.01) |
| H04N 19/124 | (2014.01) |
| H04N 19/186 | (2014.01) |
| H04N 19/182 | (2014.01) |

(Continued)

(52) U.S. Cl.
CPC .......... *G09G 5/006* (2013.01); *G06T 3/4092* (2013.01); *G06T 9/00* (2013.01); *H04N 19/124* (2014.11); *H04N 19/134* (2014.11); *H04N 19/182* (2014.11); *H04N 19/184* (2014.11); *H04N 19/186* (2014.11); *H04N 19/90* (2014.11); *G09G 2340/02* (2013.01); *G09G 2340/0407* (2013.01)

(58) Field of Classification Search
CPC ..... G06T 3/4092; G06T 9/00; G09G 2340/02; H04N 19/184

USPC ........ 348/568, 704, 441, 581, 453; 382/235, 382/298, 299; 345/600; 341/50; 375/240.25

See application file for complete search history.

(56) References Cited

U.S. PATENT DOCUMENTS

| | | | |
|---|---|---|---|
| 5,184,124 A | * | 2/1993 | Molpus ............... G09G 5/363 341/50 |
| 6,292,194 B1 | | 9/2001 | Powell, III |

(Continued)

FOREIGN PATENT DOCUMENTS

| | | |
|---|---|---|
| TW | 201007620 A | 2/2010 |
| TW | 201222479 A | 6/2012 |
| WO | 03049037 | 6/2003 |

OTHER PUBLICATIONS

International Search Report & Written Opinion, Application No. PCT/US2014/047027, mailed Feb. 18, 2016, 8 pages.

(Continued)

*Primary Examiner* — Jean W Desir (74) *Attorney, Agent, or Firm* — Meyertons, Hood, Kivlin, Kowert & Goetzel, P.C.

(57) ABSTRACT

A method and device for data compression are presented, in which a data processor may receive a packet of image data which includes four groups of N bits, where N is an integer greater than 2. The data processor may compress the received packet of data, such that a total number of bits for the converted packet is less than four times N. The data processor may compress the received packet of image data by reducing the resolution of three of the values while maintaining the resolution of the fourth value. To reduce the resolution of the three values, the data processor may apply a dithering formula to the values. The data processor may then send the converted packet via an interface.

20 Claims, 5 Drawing Sheets

(51) Int. Cl.
*H04N 19/184* (2014.01)
*H04N 19/90* (2014.01)

(56) References Cited

U.S. PATENT DOCUMENTS

| | | |
|---|---|---|
| 6,348,919 B1 | 2/2002 | Murphy |
| 7,167,181 B2 | 1/2007 | Duluk, Jr. et al. |
| 2012/0268475 A1 | 10/2012 | Hancock |
| 2012/0307151 A1 | 12/2012 | Hunleth |
| 2012/0321182 A1 | 12/2012 | Yamamoto |

OTHER PUBLICATIONS

International Search Report and Written Opinion from PCT/US2014/047027, mailed Nov. 20, 2014, Apple Inc., pp. 1-12.
"Color Quantization of Images", IEEE transactions on signal processing, IEEE service center, Dec. 1991, pp. 2677-2690.
Office Action, ROC (Taiwan) Patent Application No. 103126807, mailed Mar. 17, 2016, 6 pages.
"High-Quality Multi-Mode Mipmapping Texture Compression with Alpha Map", Chih-Hao Sun, et al, 2008, pp. 1-11.

* cited by examiner

FIG. 1

FIG. 2 a: ARGB 10:10:10:10

| ALPHA | RED | GREEN | BLUE | b: ARGB 8:9:10:9

| ALPHA | RED | GREEN | BLUE |

VIDEO DATA COMPRESSION FORMAT

BACKGROUND

Technical Field

This disclosure relates generally to processing video input for display, and more specifically to methods for modifying video encoding formats.

Description of the Related Art

Part of the operation of many computer systems, including portable digital devices such as mobile phones, notebook computers and the like, is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a "picture element", more generally referred to as a "pixel." For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. To represent a specific color on an electronic display, each pixel may have three values, one each for the amounts of red, green, and blue present in the desired color. Some formats for electronic displays may also include a fourth value, called alpha, which represents the transparency of the pixel. This format is commonly referred to as ARGB or RGBA. Another format for representing pixel color is YCbCr, where Y corresponds to the luma, or brightness, of a pixel and Cb and Cr correspond to two color-difference chrominance components, representing the blue-difference (Cb) and red-difference (Cr).

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically consists of a specified number of pixels according to the resolution of the image/video frame. Most graphics systems use frame buffers to store the pixels for image and video frame information. The term "frame buffer" often denotes the actual memory used to hold picture/video frames. The information in a frame buffer typically consists of color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The total amount of the memory required for frame buffers to store image/video information depends on the resolution of the output signal, and on the color depth and palette size. The High-Definition Television (HDTV) format, for example, is composed of up to 1080 rows of 1920 pixels per row, or almost 2.1M pixels per frame.

Various display formats are in common use today for computing devices to connect to electronic displays, including, but not limited to, older standards such as VGA and DVI, and more modern standards such as HDMI and DisplayPort. In addition, new standards are being developed such as, for example, HDBaseT. These various formats have various data resolution requirements, resulting in some formats using more data bits per pixel than others. In order to provide a high quality picture to all formats, an apparatus as discussed above may process all graphical data with enough data bits for the supported display format requiring the highest resolution. This leaves the apparatus responsible for removing data bits in order to support the other formats which use lower resolutions.

SUMMARY OF EMBODIMENTS

Various embodiments of methods and devices for compressing packets of data are disclosed. Broadly speaking a device and method are contemplated in which the device includes an interface port which may be configured to transport data packets of N bits, where N is an integer greater than 2, and a data processing unit, coupled to the interface port. The data processing unit may be configured to receive data packets of X groups of Y bits, where X times Y is greater than N. The data processing unit may be further configured to compress the received data packet such that the total number of bits for the compressed data packet is equal to N. The data processing unit may be further configured to send the compressed data packet to the interface port.

In another embodiment, the data packets may be image data to be presented on an electronic display. In a further embodiment, the electronic display may reside on a network and the interface port may be configured to transmit the image data packets to the electronic display via the network.

In other embodiments, image data packets may comprise four groups of bits, where each of the four groups of bits include data indicative of values for alpha, red, green, and blue data for one pixel of an image. In further embodiments, the data processor may be further configured to compress the image data packet by reducing the resolution of the values for alpha, red, and blue data and maintain the resolution for the value of green data. In some of these embodiments, the data processing unit may be further configured to reduce the resolution of the value of alpha data from 10 bits to 8 bits, reduce the resolution of the value of red data from 10 bits to 9 bits, reduce the resolution of the value of blue data from 10 bits to 9 bits. In further embodiments, the data processing unit may also be configured to apply a dithering formula to reduce the resolution of the values for alpha, red, and blue data.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Typically, raw video is received by an apparatus (e.g., an integrated circuit (IC), such as a system-on-a-chip (SOC), or a package such as a multi-chip module (MCM)) of a computer system in a format that is not directly compatible with the electronic display to which a display controller of the apparatus outputs frames to be displayed. In addition, the display controller may not accept the raw video format as input. Thus, at least some processing of input video may be performed by the apparatus to convert the video input into a display-compatible format before outputting the video frames to the electronic display for viewing. For example, the apparatus may be used to convert the video input from a raw video format (e.g., YUV420/1080p) to electronic display (e.g., ARGB) format frames of an appropriate size for viewing prior to feeding the video frames to the display controller. The display controller may perform additional rendering of the frames prior to feeding the frames to the electronic display.

In addition, there may be other graphical content, for example user interface graphics or objects, that may be input to the apparatus for processing and displaying to the electronic display. One or more video input streams and one or more of these other graphical input sources may be input for display concurrently. For example, a user may be watching a video on the computer system, and the operating system (OS) of the computer system or an application on the device may, during the video generate a notification or other user interface element that needs to be presented on the electronic display. Thus, in addition to video processing, another function that may be performed by the apparatus is combining these different graphical inputs such as, e.g., a video stream and one or more Graphical User-Interface (GUI) elements, into output frames to be presented on the electronic display simultaneously. This function may be referred to as window compositing.

Various display formats are in common use today for computer systems to connect to electronic displays. These various formats have various data resolution requirements, resulting in some formats using more data bits per pixel than others. In order to provide a high quality picture to all formats, an apparatus as discussed above may process all graphical data with enough data bits for the supported display format requiring the highest resolution. This leaves the apparatus responsible for removing data bits in order to support the other formats which use lower resolutions.

As previously mentioned, an HDTV video frame may be composed of up to 1080 rows of 1920 pixels per row, or almost 2.1M pixels. The ARGB format may support various resolutions for the four values of Alpha, Red, Green and Blue, such that pixels may be composed of various numbers of data bits. Simply reducing a pixel's bit count by 2 bits may reduce the amount of data to be transmitted from a computer system to an electronic display may save 4.2M bits or over 500,000 bytes.

However, reducing the bit count per pixel may reduce the total number of colors that may be produced by the display, which may reduce the overall quality of the image being displayed. The embodiments illustrated in the drawings and described below may provide techniques to reduce the impact of reducing the pixel color resolution, while minimizing the impact of the loss of pixel data.

Computer System Overview

Figure 1:
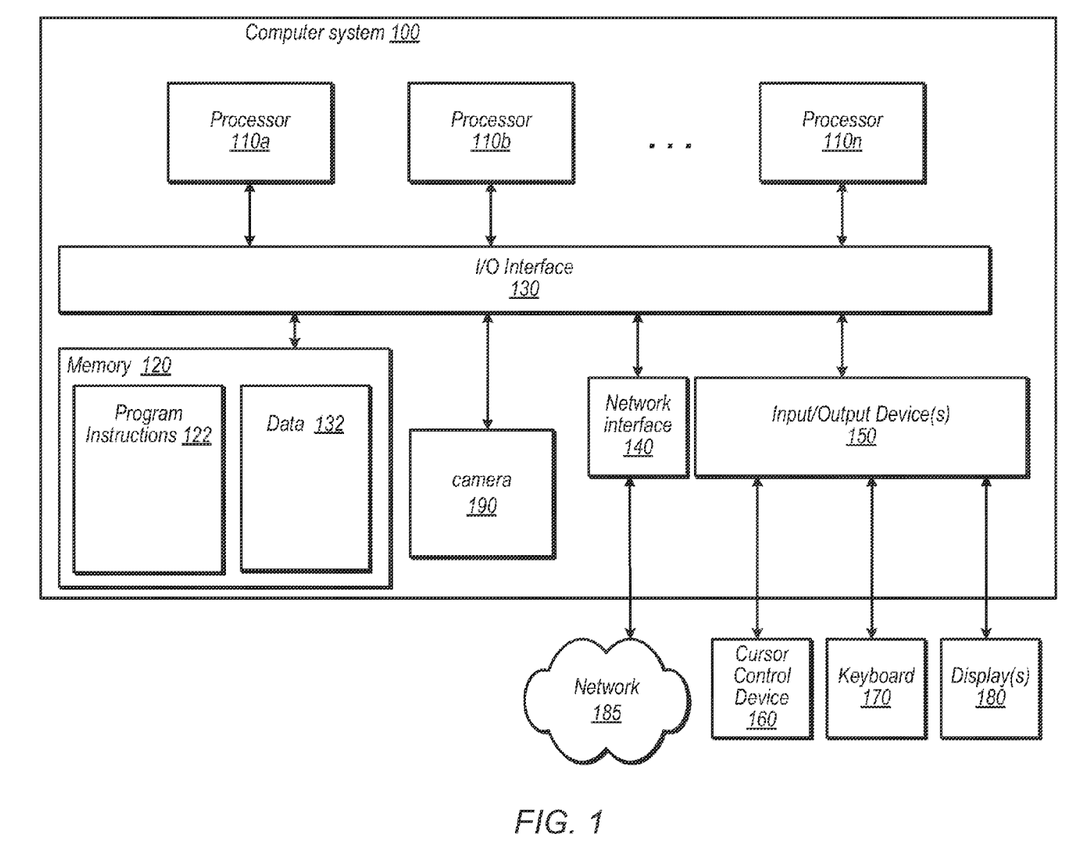
FIG. 1 illustrates a block diagram of an embodiment of a computer system.

FIG. 1 illustrates an embodiment of a computer system. In the illustrated embodiment, computer system 100, may include an apparatus implementing embodiments of image compression techniques. In different embodiments, computer system 100 may be any of various types of devices, including, but not limited to, a desktop computer, laptop, tablet or pad device, mainframe computer system, workstation, a camera, a set top box, a mobile device, a mobile phone, a consumer device, video game console, handheld video game device, or any general type of computing or electronic device.

In the illustrated embodiment, computer system 100 includes one or more processors 110 coupled to system memory 120 via input/output (I/O) interface 130. Computer system 100 further includes network interface 140 coupled to I/O interface 130, and one or more input/output devices 150, such as cursor control device 160, keyboard 170, and display(s) 180. Computer system 100 may also include one or more cameras 190, which may also be coupled to I/O interface 130. At least one of cameras 190 may be operable to capture video sequences.

In various embodiments, computer system 100 may be a uniprocessor system including one processor 110, or a multiprocessor system including several processors 110 (e.g., two, four, eight, or another suitable number). Processors 110 may be any suitable processor capable of executing instructions. For example, in various embodiments processors 110 may be general-purpose or embedded processors implementing any of a variety of instruction set architectures (ISAs), such as the x86, PowerPC, SPARC, or MIPS ISAs, or any other suitable ISA. In multiprocessor systems, each of processors 110 may commonly, but not necessarily, implement the same ISA.

System memory 120 may be configured to store program instructions 122 and/or data 132 accessible by processor 110. In various embodiments, system memory 120 may be implemented using a variety of memory technologies, such as, e.g., Static Random Access Memory (SRAM), Synchronous Dynamic Random Access Memory (SDRAM), non-volatile memory, or any other suitable type of memory. In the illustrated embodiment, program instructions 122 may be configured to implement various interfaces, methods and/or data (e.g., drivers) for controlling operations of an apparatus implementing embodiments of multiple video processing modes and embodiments of image compression techniques. In some embodiments, program instructions and/or data may be received, sent or stored upon different types of computer-accessible media or on similar media separate from system memory 120 or computer system 100.

In one embodiment, I/O interface 130 may be configured to coordinate I/O traffic between processor 110, system memory 120, and any peripheral devices in the device, including network interface 140 or other peripheral interfaces, such as input/output devices 150. In some embodiments, I/O interface 130 may perform any necessary protocol, timing or other data transformations to convert data signals from one component (e.g., system memory 120) into a format suitable for use by another component (e.g., processor 110). In some embodiments, I/O interface 130 may include support for devices attached through various types of peripheral buses, such as a variant of the Peripheral Component Interconnect (PCI) bus standard or the Universal Serial Bus (USB) standard, for example. In some embodiments, the function of I/O interface 130 may be split into two or more separate components, such as a north bridge and a south bridge, for example. Also, in some embodiments some or all of the functionality of I/O interface 130, such as an interface to system memory 120, may be incorporated directly into processor 110.

Network interface 140 may be configured to allow data to be exchanged between computer system 100 and other devices attached to a network 185 (e.g., carrier or agent devices) or between nodes of computer system 100. Network 185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 150 may, in some embodiments, include one or more display terminals, keyboards, keypads, touchpads, scanning devices, voice or optical recognition devices, or any other devices suitable for entering or accessing data by computer system 100. Multiple input/output devices 150 may be present in computer system 100 or may be distributed on various nodes of computer system 100. In some embodiments, similar input/output devices may be separate from computer system 100 and may interact with one or more nodes of computer system 100 through a wired or wireless connection, such as over network interface 140.

As shown in FIG. 1, system memory 120 may include program instructions 122, which may be processor-executable to implement any element or action to support operations of circuit blocks implementing embodiments of multiple video processing modes and embodiments of image compression techniques. In at least some embodiments, images or video captured by a camera 190 may be stored to system memory 120. In addition, metadata for images or video captured by a camera 190 may be stored to system memory 120. Video streams stored to system memory 120 may, for example, be processed by embodiments of an apparatus implementing embodiments of multiple video processing modes and embodiments of image compression techniques.

Those skilled in the art will appreciate that computer system 100 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 100 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 100 may be transmitted to computer system 100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM (Read-Only Memory), volatile or non-volatile media such as Random Access Memory (RAM), such as, e.g., Synchronous Dynamic RAM (SDRAM), Double Data Rate SDRAM (DDR), Static RAM (SRAM), etc., ROM, flash, etc. In some embodiments, a computer-accessible medium may include transmission media or signals such as electrical, electromagnetic, or digital signals, conveyed via a communication medium such as network and/or a wireless link.

Display Processor Overview

Figure 2:
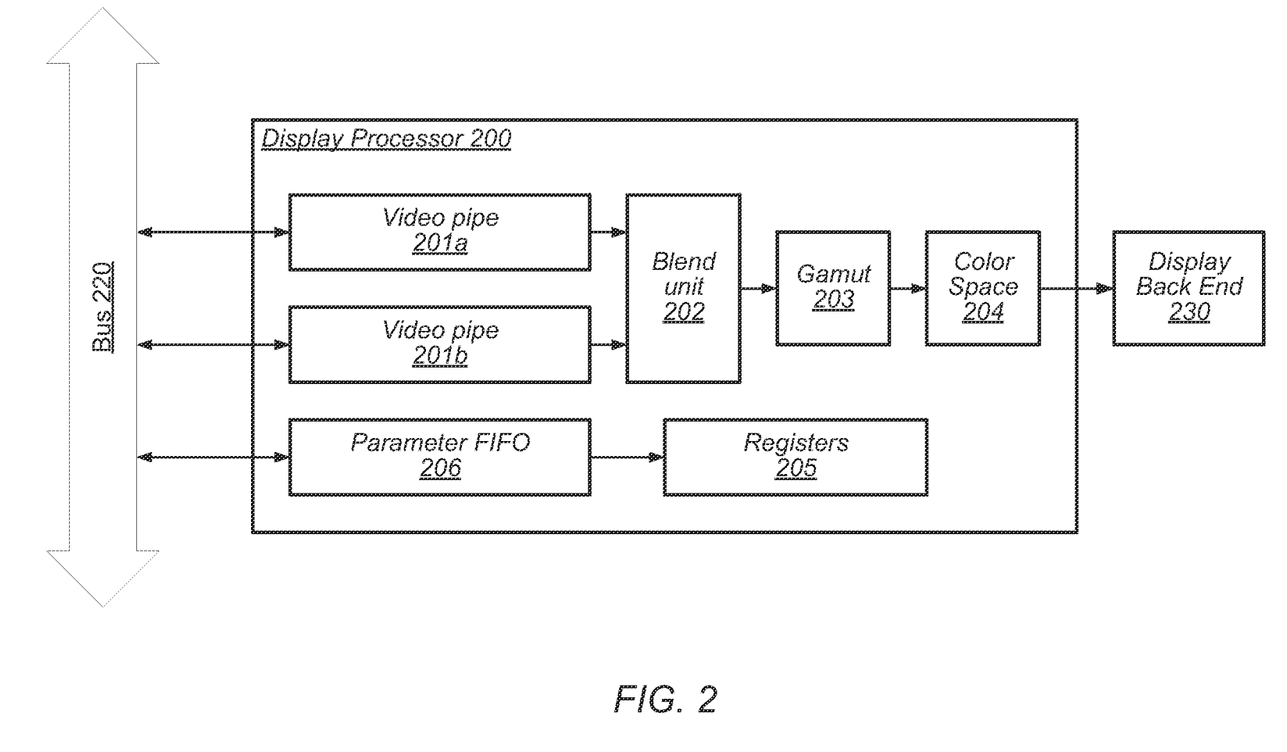
FIG. 2 illustrates a block diagram of an example embodiment of a display processor.

FIG. 2 illustrates an embodiment of a display processor 200. Display processor 200 may be coupled to a system bus 220 and to a display back end 230. Display processor 200 may include functional sub-blocks such as one or more video pipelines 201a-b, coupled to system bus 220, blending unit 202, coupled to video pipelines 201, gamut adjustment block 203, coupled to blending unit 202, color space converter 204, coupled to gamut adjustment block 203 and coupled to display back end 230. Display processor 200 may also include control registers 205, coupled to the various sub-blocks in display controller 200, and a parameter First-In First-Out buffer (FIFO) 206, coupled to system bus 220 and control registers 205.

System bus 220, in some embodiments, may correspond to I/O interface 130 from FIG. 1. System bus 220 couples various functional blocks such that the functional blocks may pass data between one another. Display controller 200 may be coupled to system bus 220 in order to receive video frame data for processing. In some embodiments, display processor 200 may also send processed video frames to other functional blocks and/or memory that may also be coupled to system bus 220.

Display back end 230 may receive processed image data as each pixel is processed by display processor 200. Display back end 230 may provide final processing to the image data before each video frame is displayed. In some embodiments, display back end may include ambient-adaptive pixel (AAP) modification, dynamic backlight control (DPB), display panel gamma correction, and dithering specific to an electronic display coupled to display back end 230.

The display processor 200 may include one or more video pipelines 201a-b. Each video pipeline 201 may fetch a video frame from a buffer coupled to system bus 220. The buffered video frame may reside in a system memory such as, for example, system memory 120 from FIG. 1. Each video pipeline 201 may fetch a distinct image and may process its image in various ways, including, but not limited to, format conversion, such as, for example, YCbCr to ARGB, image scaling, and dithering. In some embodiments, each video pipeline may process one pixel at a time, in a specific order from the video frame, outputting a stream of pixel data, maintaining the same order as pixel data passes through.

The output from video pipelines 201 may be passed on to blending unit 202. Blending unit 202 may receive a pixel stream from one or more video pipelines. If only one pixel stream is received, blending unit 202 may simply pass the stream through to the next sub-block. However, if more than one pixel stream is received, blending unit 202 may blend the pixel colors together to create an image to be displayed. In various embodiments, blending unit 202 may be used to transition from one image to another or to display a notification window on top of an active application window. For example, a top layer video frame for a notification, such as, for a calendar reminder, may need to appear on top of, i.e., as a primary element in the display, despite a different application, an internet browser window for example. The calendar reminder may comprise some transparent or semi-transparent elements in which the browser window may be at least partially visible, which may require blending unit 202 to adjust the appearance of the browser window based on the color and transparency of the calendar reminder. The output of blending unit 202 may be a single pixel stream composite of the one or more input pixel streams.

The output of blending unit 202 may be sent to gamut adjustment unit 203. Gamut adjustment 203 may adjust the color mapping of the output of blending unit 202 to better match the available color of the intended target display.

The output of gamut adjustment unit 203 may be sent to color space converter 204. Color space converter 204 may take the pixel stream output from gamut adjustment unit 203 and convert it to a new color space. Color space converter 204 may then send the pixel stream to display back end 230 or back onto system bus 220. In other embodiments, the pixel stream may be sent to other target destinations. For example, the pixel stream may be sent to a network interface, such as network interface 140 from FIG. 1, for example. In some embodiments, new color space may be chosen based on the mix of colors after blending and gamut corrections have been applied. In further embodiments, the color space may be changed based on the intended target display.

The parameters that display processor 200 may use to control how the various sub-blocks manipulate the video frame may be stored in control registers 205. These registers may include, but not limited to, setting input and output frame sizes, setting input and output pixel formats, location of the source frames, and destination of the output (display back end 230 or system bus 220). Control registers 205 may be loaded by parameter FIFO 206.

Parameter FIFO 206 may be loaded by a host processor, a direct memory access unit, a graphics processing unit, or any other suitable processor within the computing system. In other embodiments, parameter FIFO 206 may directly fetch values from a system memory, such as, for example, system memory 120 in FIG. 1. Parameter FIFO 206 may be configured to update control registers 205 of display processor 200 before each video frame is fetched. In some embodiments, parameter FIFO may update all control registers 205 for each frame. In other embodiments, parameter FIFO may be configured to update subsets of control registers 205 including all or none for each frame.

A FIFO as used and described herein, may refer to a memory storage buffer in which data stored in the buffer is read in the same order it was written. A FIFO may be comprised of RAM or registers and may utilize pointers to the first and last entries in the FIFO.

It is noted that the display processor illustrated in FIG. 2 is merely an example. In other embodiments, different functional blocks and different configurations of functions blocks may be possible dependent upon the specific application for which the display processor is intended. For example, more than two video pipelines may be included.

Example Pixel Formats

Figure 3:
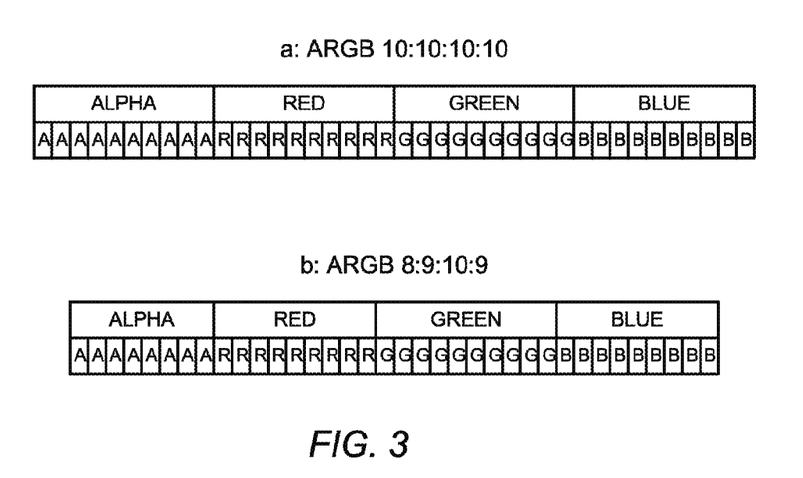
FIG. 3 illustrates two embodiments of an ARGB data format.

Turning to FIG. 3, example embodiments of two formats of ARGB pixel data are illustrated. FIG. 3a illustrates an embodiment of an ARGB 10:10:10:10 pixel format, in which 40 data bits may be used per pixel and each component of the pixel description, alpha, red, green and blue may be allotted 10 bits apiece. This 10:10:10:10 format may provide equal resolution for each pixel component.

FIG. 3b on the other hand, illustrates an embodiment of an ARGB 8:9:10:9 pixel format in which the four pixel components may not be provided equal resolution. In this pixel format, green is allotted the highest resolution while alpha is allotted the least. Reasons for allotting more resolution to green than the other components may be due to the human eye being more sensitive to variations in the color green than it is to variations in the colors blue or red. Therefore the loss of resolution in the blue and red colors may be less noticeable than a loss of resolution in green.

The alpha component may lose the most resolution, being reduced from 10 to 8 bits. Since alpha corresponds to transparency and transparency may be assigned more arbitrarily, a loss of alpha resolution may be the least noticeable. For example, an observer may be acutely familiar with the colors of a rainbow, but the observer may not have an expectation of the level of transparency of the rainbow if clouds are illustrated behind it. Therefore a loss of resolution in the alpha component may be less noticeable.

The ARGB 10:10:10:10 pixel format uses 40 bits of data while the ARGB 8:9:10:9 pixel format uses 36 bits of data. In an HDTV video with almost 2.1M pixels per frame, the difference of 4 bits between the two pixel formats will reduce the amount of pixel data per frame by almost 8.4M bits or roughly 1 million bytes per frame. A typical frame rate for a video stream may be 60 frames per second (fps), so a 30 second video stream may transmit roughly 1.8 gigabytes of data less by using the ARGB 8:9:10:9 pixel format versus the ARGB 10:10:10:10 pixel format. It is noted that the overall performance impact of the data savings may be influenced by the type interface used to transmit the video stream from display processor 200 to the final video destination.

Example Flow of a Video Stream

Figure 4:
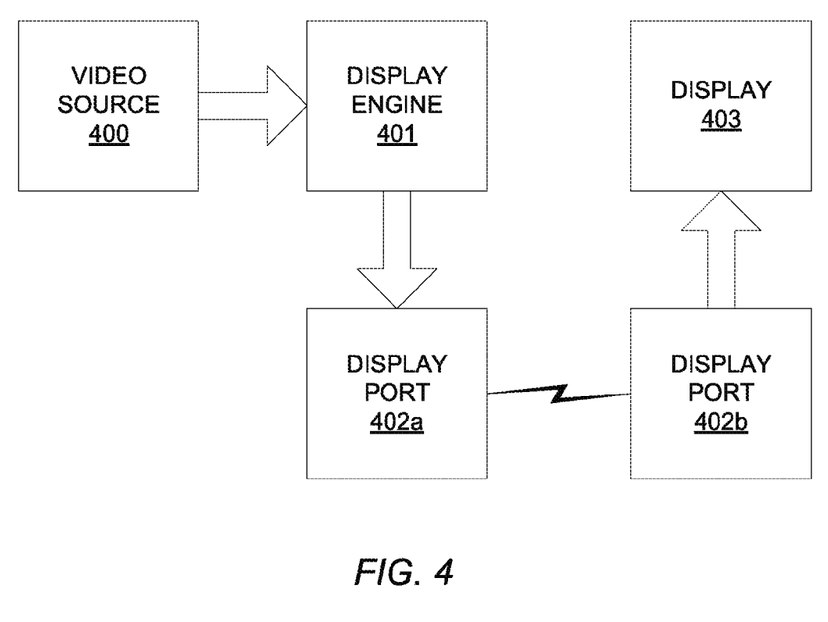
FIG. 4 illustrates a flow diagram of an embodiment of a display system.

Turning to FIG. 4, an embodiment of transmitting a video stream in a computing system, such as, e.g., computing system 100 as depicted in FIG. 1 is illustrated. Referring collectively to computer system 100 and the flow diagram in FIG. 4, the flow may start with video source 400. In various embodiments, video source 400 may be a file in system memory 120 or video source 400 may be animation rendered by an application running on computer system 100. In further embodiments, video source 400 may also be camera 190. Independent of the source of the video, video source 400 may be in any suitable file format, such as, for example, Moving Pictures Expert Group-4 Part 14 (MP4), Advanced Video Coding (H.264/AVC), or Audio Video Interleave (AVI).

Display engine 401 may fetch the video from video source 400 or video source 400 may send the video to display engine 401. Display engine 401 may correspond to display processor 200 in FIG. 2 or in other embodiments, display processor 200 may be part of a larger processing system within display engine 401. In some embodiments, display engine 401 may process the video a pixel at a time and in other embodiments display engine 401 may process the video by receiving an entire frame and processing one or more pixels at a time. Display engine 401 may send a stream of the processed video to display port 402a. In alternate embodiments, display engine 401 may stream the processed video into a buffer from which display port 402a may fetch the video.

Display ports 402 may comprise a display specific interface, such as, for example, HDMI. In such embodiments, the display may be coupled to computer system 100 through a cable. In other embodiments, display ports 402 may comprise a single functional block on an SoC and may drive a display 403 incorporated into computing system 100. In alternate embodiments, display ports 402 may comprise a generic networking interface, such as, for example, Ethernet, Wi-Fi, or Bluetooth. Display ports 402 may transport the video stream from display engine 401 to display 403. When sending (also referred to herein as "transporting") the video stream, display port 402a may encrypt the data comprising the video stream from display engine 401 before sending the data to display port 402b, which may then decrypt the video stream. In some embodiments, display port 402a may divide the video stream into data packets, adding data bits to each packet as required for a given interface format. In embodiments in which more than one display are coupled to computer device 100, an address may be appended to the video stream to indicate which display is the intended target destination.

Display 403 may receive the video stream from display port 402b. In some embodiments, display 403 may display the video stream without any further image processing. In other embodiments, display 403 may further process the video stream before displaying images. Further processing may include final gamut corrections or mapping to a color space specific to the display.

It is noted that the embodiment illustrated in FIG. 4 is merely an example. In other embodiments, different functional blocks may be employed for transmitting a video stream and the processing performed by each functional block may differ from the processing previously described.

Method for Compressing Pixel Data

Figure 5:
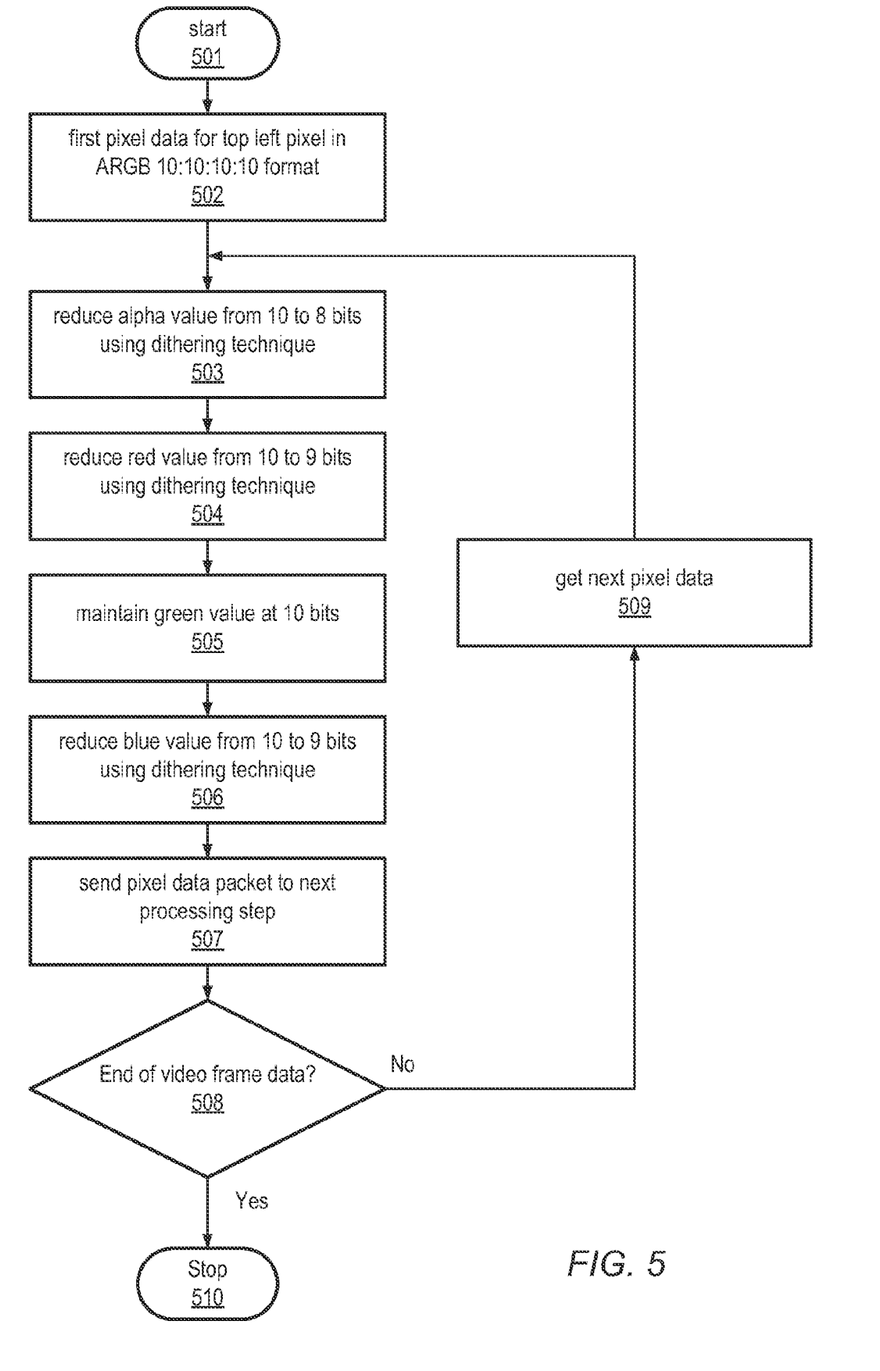
FIG. 5 illustrates a flowchart of an embodiment of a method for compressing ARGB data.

Turning to FIG. 5, a method is illustrated for compressing pixel data in an ARGB format in an embodiment of a display processor, such as, for display processor 200 from FIG. 2. Referring collectively to display processor 200 and the flow diagram in FIG. 5, the method may start in block 501. Display processor 200 may receive the ARGB 10:10:10:10 formatted data for the first pixel, corresponding to the top left corner of the image (block 502). In other embodiments, the pixel data may be received in other formats, such as, e.g., ARGB 10:13:14:11 or ARGB 16:16:16:16. Display processor 200 may be sent the pixel data or display processor 200 may fetch the pixel data from a buffer within computer system 100.

Display processor 200 may read the 10-bit alpha value from the received pixel data and reduce the bit count to 8 bits (block 503). In some embodiments, any suitable dithering technique, as described below in more detail, may be used to minimize visual impact of the loss of 2 bits of resolution. Display processor 200 may save the new 8 bit value for alpha in register space or in other embodiments in system memory.

Display processor 200 may next read the 10 bit red value from the received pixel data and reduce the bit count to 9 bits (block 504). Again, a suitable dithering technique may be used to minimize the visual impact of the loss of a bit of resolution from the red value. Display processor 200 may append the new 9 bit value for red to the 8 bit alpha value. In other embodiments, the values may be saved separately until all processing has been completed.

Display processor 200 may next read the 10 bit green value from the received pixel data maintain the bit count at 10 bits (block 505). In other embodiments, such as, e.g., if the green value has more than 10 bits of resolution, the green value may also be reduced. In such embodiments, a suitable dithering technique may be used. Display processor 200 may append the 10 bit value for green to the 17 bits of alpha and red pixel data. In other embodiments, the values may be saved separately until all processing has been completed.

Display processor 200 may next read the 10 bit blue value from the received pixel data and reduce the bit count to 9 bits (block 506). As with the red and alpha values, a suitable dithering technique may be used on the blue value. Display processor 200 may append the new 9 bit value for blue to the 27 bits of alpha, red, and green pixel data. In other embodiments, the values may be saved separately until all processing has been completed.

The 36 bits of pixel data may be sent to the next processing step within display controller 200 (block 507). In some embodiments, the compression of the pixel data may occur before any other processing is performed by display controller 200. In other embodiments, the pixel data compression may occur at the end after all other processing within display processor 200 has occurred, and the compressed pixel data may be sent to display back end 230 or to system memory 120 via system bus 220.

After transferring the compressed pixel data to the next step, display processor 200 may determine if more pixels from the same video frame need to be compressed (block 508). If more pixels require compression, the method may move to block 509 and receive the 40 bit ARGB data for the next pixel. The method may then repeat starting at block 503. When all pixel data for a given frame has been compressed, the method may end in block 509.

It is noted that the illustrated method is merely an example and that variations of the method are possible. For example, in other embodiments, the compression of each component of the pixel data may occur in a different order or in parallel. In the example embodiment, display controller 200 performs the compression at the beginning or end of pixel data processing, in other embodiments, the compression may occur at any step within the processing of the pixel data. In some embodiments, the compression may be performed by a different functional block either before display processor 200 receives the pixel data or after display processor 200 has completed processing the pixel data.

Method for Dithering Pixel Data

Figure 6:
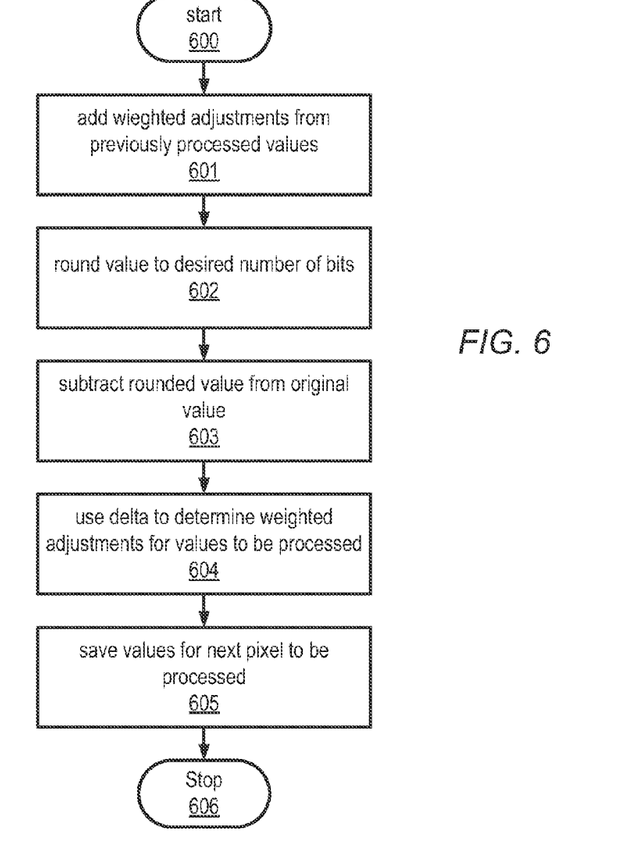
FIG. 6 illustrates a flowchart of an embodiment of a method for dithering image data.

Moving to FIG. 6, a method is illustrated for dithering a component of pixel data. In some embodiments, this method may correspond to the dithering of alpha, red, and blue values presented in FIG. 5 in steps 503, 504 and 505. Referring to the flow diagram in FIG. 6, the method may start in block 600. Weighted adjustments from one or more previously processed pixels may be added to the current component value being compressed (block 601). If the first pixel in a frame is being processed, then nothing will be added.

The method may then move to block 602. The component value being compressed may be rounded to the nearest value with the desired number of bits, i.e., alpha component values may be rounded to the nearest 8 bit value, and red and blue component values may be rounded to the nearest 9 bit values. In other embodiments, the value may be truncated to the desired number of bits rather than rounded.

The rounded value may then be subtracted from the original value to determine a quantization delta caused by rounding to fewer bits of resolution (block 603). This quantization delta may be a positive or negative number, depending on whether the value was rounded up or down.

Moving to block 604, the method may use the quantization delta to determine adjustments for pixels to be processed. Depending on the dithering algorithm used, the quantization delta may be divided and weighted such that one or more adjacent pixels, still to be dithered, may receive a fraction of the quantization delta from the currently processed pixel as part of the weighted adjustment from block 601.

The weighted adjustments may be saved for use when the corresponding pixel is processed (block 605). In some embodiments, a given pixel may receive weighted adjustments from multiple pixels that have previously been dithered, requiring newly calculated adjustments to be added to any previously calculated adjustments for the given pixel. The method may end in block 606.

It is noted that FIG. 6 is merely one example of dithering pixel components. In other embodiments, different adjustments to different numbers of pixels may be employed.

Figure 7:
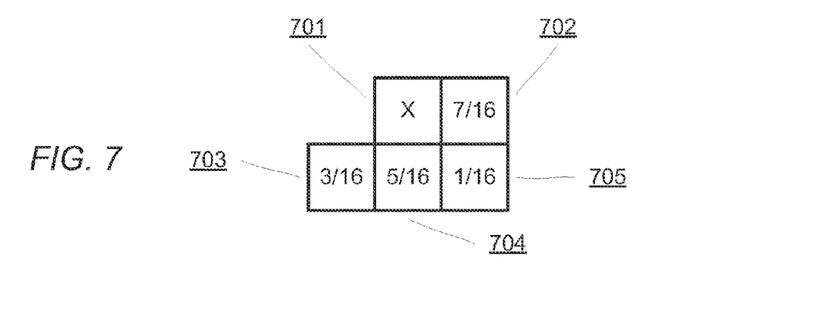
FIG. 7 illustrates an example of weighting adjustments for adjacent pixels in a dithering algorithm.

FIG. 7 illustrates an example of how the quantization delta may be divided and weighted for adjacent pixels to be processed for a certain dithering algorithm. In some embodiments, when a video frame is processed, the pixels comprising the frame may be processed in order, from left to right in a given row and the rows may be processed from top to bottom, relative to how they would appear on a display, such as for example, display 403.

A suitable dithering algorithm for use in the method of FIG. 6 may be the Floyd-Steinberg algorithm. In this algorithm, the quantization delta is divided into 4 values for use with 4 pixels to be processed. FIG. 7 demonstrates how the 4 values may be weighted between the four pixels. Pixel 701 represents the pixel being processed. Pixels 702-705 are the four adjacent pixels that have yet to be processed. Pixel 702 may receive $7/16$ of the quantization delta of pixel 701. Similarly, pixel 703 receives $3/16$ of the quantization delta of pixel 701, pixel 704 receives $5/16$ of the quantization delta of pixel 701 and pixel 705 receives just $1/16$ of the quantization delta of pixel 701. Note that the fractional values add up to one, so the entire value of the quantization delta of pixel 701 is used on adjacent pixels. Also, it is noted that a given pixel may have up to 4 weighted adjustments added to its component values, using this example algorithm. Pixels along the edges of the video frame may have fewer.

The method of FIG. 6 is merely illustrative and is not intended to limit the scope of the embodiments. Although the Floyd-Steinberg algorithm is used for the purposes of illustrating, any other suitable dithering algorithm such as, e.g., Sierra, Jarvis, Stucki, Atkinson, may be employed in various other embodiments. It is further noted that although the steps of the method are presented as being performed in a serial order, in other embodiments, some or all of the steps may performed in parallel.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A device, comprising:
    an interface port configured to transport a plurality of compressed data packets, wherein a given compressed data packet of the plurality of compressed data packets includes N bits, and wherein N is an integer greater than 2; and
    a data processing unit coupled to the interface port, wherein the data processing unit is configured to:

receive uncompressed data packets, wherein a given uncompressed data packet includes a total number of bits greater than N, and wherein the given uncompressed data packet includes four groups of bits, wherein each group of the four groups of bits includes data indicative of values for pixel components, including alpha, red, green, and blue pixel components;

compress the given uncompressed data packet, wherein a total number of bits for the compressed data packet is equal to N, and wherein to compress the given uncompressed data packet, the data processing unit is further configured to:

apply a dithering algorithm to each of the values for the pixel components to be compressed, wherein the dithering algorithm includes adding a weighted adjustment to each of the values based on at least one previously dithered pixel components; and reduce the resolution of the dithered values for the pixel components, wherein the value of the green pixel component maintains the highest resolution; and send the compressed data packet to the interface port.

2. The device of claim 1, wherein the uncompressed data packets and compressed data packets comprise image data to be presented on an electronic display.

3. The device claim 2, wherein the interface port is further configured to send the compressed data packet via a network interface to a remote electronic display.

4. The device of claim 1, wherein the uncompressed data packets include forty bits of data, and wherein each group of the four groups of bits includes ten bits of data.

5. The device of claim 1, wherein to compress the given uncompressed data packet, the data processing unit is further configured to:

reduce the resolution of the values for the alpha, red, and blue pixel components; and maintain the resolution for the value of the green pixel component.

6. The device of claim 5, wherein to compress the given uncompressed data packet, the data processing unit is further configured to reduce the resolution of the value for the alpha pixel component to eight bits, and the values for the red and blue pixel components to nine bits each.

7. The device of claim 1, the weighted adjustment is based on a difference between an uncompressed value and a compressed value for a previously compressed pixel component.

8. A method for data compression, comprising:

receiving a packet of data, wherein the received packet of data includes N bits, wherein N is an integer greater than 4, wherein the received packet of data includes four groups of bits, wherein each group of the four groups of bits includes data indicative of values for pixel components, including alpha, red, green, and blue pixel components;

converting the received packet of data, wherein the converted packet of data includes a total number of bits less than N, and wherein converting the received packet of data comprises:

applying a dithering algorithm to each of the values for the pixel components to be compressed, wherein the dithering algorithm includes adding a weighted adjustment to each of the values based on at least one previously dithered pixel components; and reducing the resolution of the dithered values for the pixel components, wherein the value of the green pixel component maintains the highest resolution; and sending the converted packet of data via an interface wherein converting the received packet of data further comprises reducing the resolution of the values for the alpha, red, green, and blue pixel components, wherein the value of the green pixel component maintains the highest resolution.

9. The method of claim 8, wherein the received packet of data comprises image data to be presented on an electronic display.

10. The method claim 9, wherein sending the converted packet of data via the interface further comprises sending the converted packet via a network interface to a remote electronic display.

11. The method of claim 8, wherein the packet of data includes forty bits of data for the pixel components, including ten bits each to indicate alpha, red, green, and blue.

12. The method of claim 8, wherein converting the received packet of data further comprises:

reducing the resolution of the values for the alpha, red, and blue pixel components; and maintaining the resolution for the value of the green pixel component.

13. The method of claim 12, wherein converting the received packet of data further comprises reducing the resolution of the value for the alpha pixel component to eight bits, and the values for the red and blue pixel components to nine bits each.

14. The method of claim 8, wherein the weighted adjustment is based on a difference between an uncompressed value and a compressed value for a previously compressed pixel component dependent upon one or more new values for previously processed pixel components.

15. A system, comprising:

a memory configured to store a plurality of uncompressed data packets, wherein a given uncompressed data packet of the plurality of uncompressed data packets includes N bits and wherein N is greater than 4;

an interface controller, configured to transport a plurality of compressed data packets; and a packet processor coupled to the interface controller and coupled to the memory, wherein the packet processor is configured to:

fetch an uncompressed data packet from the memory;

compress the uncompressed data packet, wherein a total number of bits for the compressed data packet is less than N, and wherein to compress the given uncompressed data packet, the packet processor is further configured to:

apply a dithering algorithm to each of the values for the pixel components to be compressed, wherein the dithering algorithm includes adding a weighted adjustment to each of the values based on at least one previously dithered pixel components; and reduce the resolution of the dithered values for the pixel components, wherein the value of the green pixel component maintains the highest resolution; and send the compressed data packet to the interface controller.

16. The system of claim 15, wherein the uncompressed data packets and compressed data packets include image data to be presented on an electronic display.

17. The system of claim 15, wherein the uncompressed data packets include forty bits of data, and wherein each group of the four groups of data includes ten bits of data.

18. The system of claim 17, wherein to compress the uncompressed data packet, the packet processor is further configured to:
- reduce the resolution of the values for the alpha, red, and blue pixel components; and
- maintain the resolution for the value of the green pixel component.

19. The system of claim 18, wherein to compress the uncompressed data packet, the packet processor is further configured to reduce the resolution of the value for the alpha pixel component to eight bits, and the values for the red and blue pixel components to nine bits each.

20. The system of claim 15, wherein the weighted adjustment is based on a difference between an uncompressed value and a compressed value for a previously compressed pixel component.

* * * * *